United States Patent

Sugier et al.

Patent Number: 5,275,209
Date of Patent: Jan. 4, 1994

[54] HOSE INCLUDING AN ALUMINUM ALLOY

[75] Inventors: Andre Sugier, Reuil Malmaison; Jose M. Herrero, Paris, both of France

[73] Assignees: Institut Francais du Petrole, Rueil Malmaison; Coflexip, Paris, both of France

[21] Appl. No.: 840,142

[22] Filed: Feb. 24, 1992

Related U.S. Application Data

[63] Continuation of Ser. No. 465,097, Feb. 16, 1990, abandoned.

[30] Foreign Application Priority Data

May 9, 1988 [FR] France ................ 88 06242

[51] Int. Cl.$^5$ ............................................. F16L 11/12
[52] U.S. Cl. ..................................... 138/135; 138/129; 138/130
[58] Field of Search ............. 138/129, 130, 131, 133, 138/134, 135, 144, 172, 174, 132

[56] References Cited

U.S. PATENT DOCUMENTS

| | | | |
|---|---|---|---|
| 2,640,501 | 6/1953 | Scott et al. | 138/130 |
| 3,858,616 | 1/1975 | Thiery et al. | 138/133 |
| 3,908,703 | 9/1975 | Bournazel et al. | 138/137 |
| 4,013,100 | 3/1977 | Thiery et al. | 138/129 |
| 4,019,539 | 4/1977 | Hoffman et al. | 138/129 |
| 4,403,631 | 9/1983 | Abdullaev et al. | 138/134 |
| 4,549,581 | 10/1985 | Unno et al. | 138/129 |
| 4,867,205 | 9/1989 | Bournazel et al. | 138/130 |
| 4,903,735 | 2/1990 | Delacour et al. | 138/133 |
| 5,176,179 | 1/1993 | Bournazel et al. | 138/130 |

FOREIGN PATENT DOCUMENTS 147288 7/1985 European Pat. Off. .

OTHER PUBLICATIONS

"Properties of Commercial Wrought Alloys" by Nock in vol. I. Properties Physical Metallurgy and Phase Diagrams, Feb. 1968, Chapter 9, pp. 303, 304, and 306.

*Primary Examiner*—James E. Bryant, III
*Attorney, Agent, or Firm*—Antonelli, Terry, Stout & Kraus

[57] ABSTRACT

A reinforced hose including at least one of a pressure-resistant reinforcement, a tensile-strength reinforcement and/or an inner carcass. At least one of the pressure-resistant reinforcement, the tensile-strength reinforcement and the inner carcass have at least one elongated element formed as one of a profile, a cable, an interlockable wire, and a strip with the at least one elongated element being composed of an aluminum-based alloy.

35 Claims, 2 Drawing Sheets

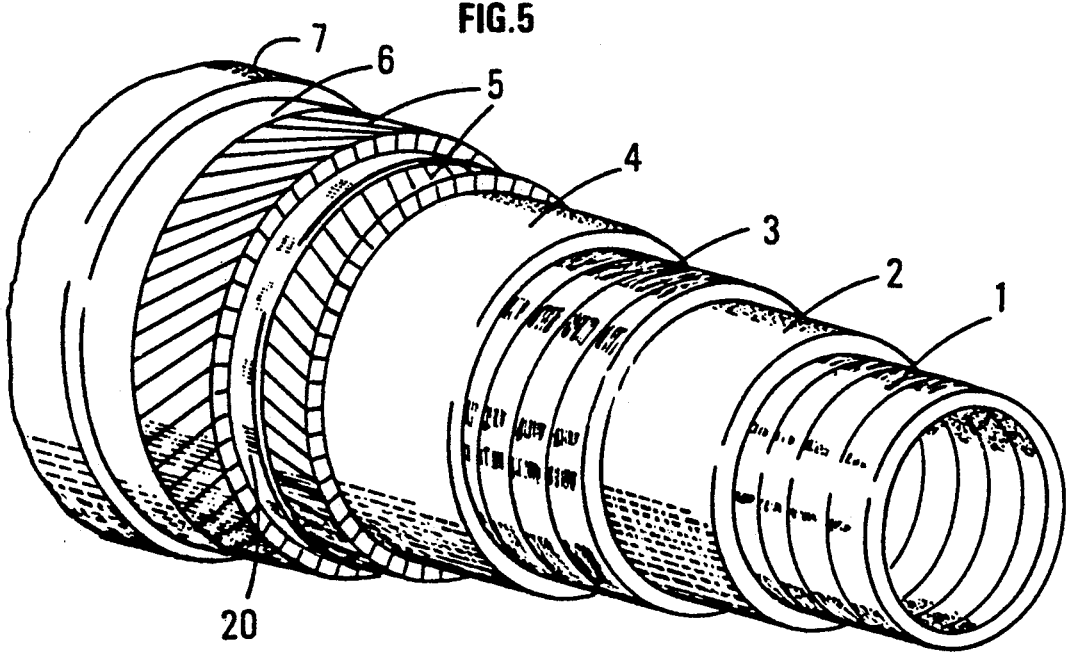

HOSE INCLUDING AN ALUMINUM ALLOY

This is a continuation of application Ser. No. 07/465,097 filed Feb. 16, 1990, now abandoned.

FIELD OF THE INVENTION

The present invention relates to a new hose design which is lighter than the hoses in the prior art while retaining the proper performance, particularly mechanical performance.

The invention applies in particular to making hoses for transporting fluids under pressure, such as water or hydrocarbons.

BACKGROUND OF THE INVENTION

For numerous applications of such hoses, it is often desirable and sometimes necessary to have light hoses available, particularly for deep-sea applications.

The hoses according to certain embodiments of the present invention may, in particular, be laid at sea at great depths.

One of the problems encountered when such hoses are laid at great water depths results from the weight of the suspended hose.

The strain on the hose resulting from its weight increases with increasing proximity to the surface of the water, starting from the bottom.

Thus, it is when the hose is held at the surface that the greatest strain is found in the hose.

SUMMARY OF THE INVENTION

One of the ways of reducing this strain is to lighten the weight of the hose while substantially maintaining its mechanical performance and this is proposed by the present invention.

The hoses to which the present invention applies in particular may include at least one of the four following components, each of which may include one or more elongated elements such as a profile, a cable, a wire, or a strip:

an internal carcass made of an interlocked strip or interlocked or hooked wires, a reinforcement, a pressure-strength reinforcement comprising a shaped elongated element, and/or an outer carcass made of an interlocked or hooked strip or wires.

Of course, these elongated elements can preferably be wound helically to form the hose, with or without a plastic sheath.

The present invention relates, in general, to all hoses having a metal reinforcement or armature, which are used under conditions such that the weight of this reinforcement or armature creates difficulties.

More specifically, hoses whose application conditions are limited by the density of the metallurgical material of which the armature elements are composed, generally steel, because of the fact that, if the cross section of these elements is increased in order to increase the mechanical strength of the hose, there is an increase in the weight of the hose, and hence an increase in the stresses applied to the hose as a function of which the elements constituting the reinforcement are sized.

Thus, an extremely useful application for the invention relates to hoses intended for offshore oil production at moderate or great depths, which include pipelines linking the sea bed to the surface (generally known as risers) and pipelines that must be laid from the surface to the depths to form a connection (over a distance which may vary considerably from one case to another), for example, between an underwater wellhead and the lower end of the riser, or an element (manifold) that connects several pipelines and constitutes the base of the riser.

Such hoses are used to carry crude oil or gas produced by the underwater well at very high pressures (e.g. 500 bars), or to carry gas or water injected under pressure into the producing formation, or to send to land or carry to the collecting and shipping facilities (offshore loading stations for example) the oil or gas previously treated on board the producing platform, or to ensure the control functions of the underwater wellheads (hydraulic or electrical lines known as umbilicals).

At the present state of the art, all known hoses used or usable for the applications described above, for which the inside diameters may vary for example between 1" (2.54 cm) and about 20" (50.8 cm) and for the commonest applications, between 3" (7.62 cm) and 10" (25.4 cm) or 12" (30.48 cm), are made from reinforcement elements made only of steel (carbon steel, stainless steel, steel alloy).

When the depth at which the hoses are to be installed is still relatively limited—about 100 to 200 or 300 meters (which even today is the most frequent case with the present status of the market), the water depth does not play an essential role as a sizing parameter for the design of the hose, which is principally conditioned by the maximum internal pressure value considered.

On the other hand, certain offshore oil fields are producing at depths in the 500 to 800 meter range, and the trend to operating at greater water depths is becoming firmer, with certain projects exceeding 1000 meters.

With the present state of the art, the characteristics of the steel-reinforced hoses, which are the only ones now available for the applications in question, are such that:

after a certain water depth, which can vary from 400 m to about 700 m, it is necessary to take special steps which have a substantial impact on costs, by reinforcing the metal structure of the hose and/or using special procedures and equipment to install it on the site, and the ultimate water depth limits that may be reached with these currently known hoses may be estimated to be about 600 m to 1000 m, or a maximum of just over 1000 m for diameters less than 6, with the limit varying according to the diameter of the hose, the maximum service pressure, and various other parameters that affect sizing of the hose (such as the characteristics of the fluid carried, environmental conditions, and the conditions under which the hose is laid).

Hence, a need for a novel technical solution already exists and will become increasingly acute.

More generally, the invention applies to all cases where the weight of the hoses currently available creates constraints on use. For example, the high-pressure hoses used in oil fields such as injection hoses (rotary hoses) and well control lines (kill lines, choke lines) whose application and handling may be facilitated if lighter hoses become available.

The invention may find another useful application in floating hoses which are used in particular in offshore loading/offloading facilities to connect a buoy anchored at sea and a tanker moored to the buoy. The lightening of the structure resulting from the use of aluminum allows a size reduction of the buoys and other buoyancy elements that have to be added to the hose to float it, and which have various drawbacks such as cost, size, vulnerability to currents and wind.

The invention that allows hoses of high mechanical strength and low weight to be made may also be applicable in aeronautics or space.

The use of aluminum instead of steel under the conditions provided by the invention is also highly advantageous for various particular applications, for example, making carasses of interlocked strip installed in certain cases for mechanical protection outside the hose by winding the interlocked strip around the outer plastic sheath.

Moreover, in certain cases, replacement of the steel (whatever the type of steel envisaged) by an aluminum alloy may be of advantage. Thus, for example, since the inner carcass with which certain hoses are provided, particularly those intended to carry crude oil from the deposit (rough bore hoses) is exposed to the corrosive action of the fluid carried, the use of aluminum may in certain cases allow savings by comparison with the stainless steels that would be necessary.

Moreover, the use of aluminum may be useful in certain cases where there is a risk of the fluid carried being contaminated by the internal wall material of the hose, which would make the use of steel impossible (at least carbon steel; stainless steel could be used but would be far most costly); thus, for example, in the case of aqueducts or pipelines carrying certain chemicals.

Other cases may occur in which certain properties of the aluminum constitute an advantage over steel and create a possible useful application for the invention, for example the a magnetic property of aluminum.

The hoses according to the present invention may be used in above-ground facilities, for example, fluid transfer lines particularly in cold regions or lines for transferring cold fluid. They have good low-temperature impact resistance while current steels are brittle at temperatures of about $-20°$ C.

For this type of application, the hoses according to the present invention may include aluminum for all the components of the hose (carcass, reinforcement) or only for those exposed to temperatures of approximately $-20°$ C. or lower than $-20°$ C.

To summarize, the invention may be applied in all cases where, on the one hand, aluminum has an advantage over steel (lightness, corrosion resistance, etc.) and the relatively high mechanical forces applied to the hose (internal pressure, external pressure, crushing effect, axial load, etc.) require products (drawn, wire, cable, strip) that offer high mechanical strength by comparison to that obtainable with steel.

With the goal of making hoses lighter than the hoses currently available, whose reinforcements are made of steel elements, and of making hose reinforcements with materials able to withstand certain particular effects, various solutions have already been proposed.

Thus, for example, certain techniques have been developed by applicants allowing hose reinforcement wires to be made of composite materials composed of fibers embedded in a plastic resin (FR-2,283,768, FR-2,312,356, and EP-263,860).

The use of composite materials with organic materials allows a further step to be taken in lightening the structures of hoses, particularly in the case of the deep-sea applications discussed above, and to open the way to operating underwater fields at extremely great depths. However, these composites with an organic matrix are relatively expensive, and by comparison, aluminum is far more economical.

It has been established that the use of alloy to apply the invention must, in the case of applications to the offshore oil production pipelines discussed above, allow facilities to be created in water as deep as or deeper than 1500 m, so that the aluminum in the applications considered above, beyond the limits permitted by steel, may find a very large market, assuming that certain cases requiring even higher performance would be covered by the use of composite materials.

In meeting the needs in the area of light hose, previous practice had not assumed that aluminum could be used. The sizes of such hoses led to products of such bulk and to such a deterioration in mechanical performance as to cancel out the effects of the weight advantage.

The present invention proposes a selection and treatments of aluminum and a hose design which allows the weight of the hose to be considerably reduced, leading to products that are usable and fully efficient.

The invention relates in particular to the various metal reinforcement elements of hoses usable in the applications described above.

In the terms of the invention, any of the following hose reinforcement elements in any combination may be made of aluminum alloy under the conditions characterizing the invention:

1. The wires of which the so-called tensile strength and bottom effect reinforcement are made (this reinforcement may also withstand all or some of the effects of circumferential pressure as a function of the winding angle which may range between a few degrees and a maximum of about 80° but which in general is between 10° and about 65°).

These wires have a cross section which may be circular, possibly elliptical, or (very often) rectangular with, preferably, rounded angles (the wires being, according to the invention, made of aluminum alloy . . . ).

2. The elements constituting the tensile strength and bottom effect reinforcement made in the form of strands or cables, themselves made by helical winding (twisting) of wires, according to the invention, made of aluminum. Where strands or cables are used as the reinforcement element, they are commonly disposed inside a compact mass of elastomeric material.

3. The wires or "profiles" forming the "pressure reinforcement" whose function is to withstand the effects of internal pressure and the effects of compression (particularly linked to hose-laying operations in the case of underwater pipelines) and the effects of external pressure. These profiles are commonly made of rectangular-cross-section wires whose corners are preferably rounded.

They are often made in the form of a ply or two plies of profiles with a cross section that has notches and projections so as to produce a mutual hooking effect sometimes designated "interlocking," such as:

a ply of one or more Z-section wires, for example, the profile usually known as Zeta (see, for example, the description of a profile of this kind in French Patent FR-2,052,057 of Chiers-TCBH), two plies of U-section wires, the legs of the U of the inner ply being directed outward to interlock with the inward-facing legs of the U of the outer ply, or other possible constructions.

It should be noted that the "pressure reinforcement" may be made by combining several layers of one or another of the types described above.

The profiles or wires of which the pressure reinforcement is formed are wound at angles of approximately 80° to 90° to the axis of the hose.

4. The elements of which the outer carcass of the hoses is composed, including the structures made by bending of a continuous strip and structures composed of wires interlocked or hooked such as those described for the pressure reinforcement (FIGS. 3 and 4), bending being effected such as to make, for example, U shaped profiles along the two edges of the strip to allow adjacent turns to be hooked together. Bending may be done according to many types of designs.

One well-known form is described in French Patent Application EN-83/19.474 (interlocked strip) which describes a method for making a hose of interlocked strip applicable to hoses according to the invention. These "interlocked strips" are currently used as the internal carcasses of hoses, particularly when crude oil is being transported from the deposit, to prevent "implosion" of the internal plastic sheath.

They can also be used as pressure-resistant reinforcement when wound around the inner sealing sheath.

These interlocked strips or interlocked or hooked wires may also be used as external protection for the hose.

The element forming the carcass may also be formed by an interlockable or hookable wire such as Z-shaped cross section and particularly a zeta-section wire.

Thus, the present invention relates to a reinforced hose having one or more of the following components: a pressure-strength reinforcement, a tensile-strength reinforcement, and/or an internal carcass.

It is characterized by at least one of said components having one or more elongated elements such as a profile, a cable, a wire, or a strip, with the element having undergone a working operation and being composed of an aluminum-based alloy.

The aluminum alloy may be an aluminum alloy in the series 2000, 5000, 6000, or 7000 (AFNOR Quality Standards).

When the hose according to the invention has a pressure-strength reinforcement and/or a tensile-strength reinforcement, at least one of said reinforcements may have at least one elongated element composed of an aluminum alloy in one of the series 2000, 5000, 6000, or 7000 and preferably in one of the following grades: 2014, 2017, 2024, 2117, 2618, 5050, 5052, 5056, 5082, 5086, 5154, 5183, 5754, 6005, 6060, 6061, 6063, 6066, 6070, 6082, 6351, 7001, 7020, 7049, 7050, 7075, 7175, 7178, or 7475.

The aluminum alloy elongated element may have a tensile strength (Rm) of at least 300 MPa and preferably at least 350 MPa.

When the hose according to the invention has an internal carcass, this may have at least one elongated element composed of an aluminum alloy in one of the series 1000, 2000, 3000, 4000, 5000, 6000, 7000, and, preferably, in one of the grades: 1100, 1180, 3103, 5050, 5052, 5056, 5083, 5456, 6060, 6061, 6082, 6083, or 6106.

When the hose according to the invention has a carcass, it may have at least one elongated element composed of an aluminum alloy with a tensile strength (Rm) of at least 200 MPa and, preferably, at least equal to 250 MPa and an elasticity limit at 0.2% $Re_{0.2}$ of at least 150 MPa and preferably at least equal to 190 MPa.

When the hose according to the invention has an internal carcass which has at least one elongated element composed of an aluminum alloy, this elongated element may be a profile or a hookable or interlockable wire, particularly, of the Zeta type.

The aluminum alloy used according to the present invention may undergo separate dissolution heat treatment.

The elongated element including the aluminum alloy according to the present invention may have undergone a work-hardening operation as final treatment preceded and/or followed by tempering.

This work-hardening may be cold work-hardening of at least 3% in the case where an aluminum alloy in the series 2000, 6000, or 7000, or at least 20% when an aluminum alloy in the 5000 series is used.

This work-hardening may, preferably, be cold work-hardening of between 3 and 40%; preferably between 5 and 25% where an aluminum alloy in the 2000, 6000, or 7600 series is used.

This work-hardening may also be cold work-hardening of between 20 and 90%; preferably between 40 and 70%, if an aluminum alloy in the 5000 series is used.

The elongated aluminum alloy element according to the present invention may have undergone rolling or drawing.

This elongated element may have undergone partial or total annealing or a hardening and tempering operation whose characteristic parameters are a function of the degree of work-hardening and/or the nature of the alloy.

The component including the aluminum according to the present invention may be covered with a an alloy to protect against rust.

The component including aluminum may be covered with a thermoplastic film such as polyethylene, polyamide, PolyVinylidene DiFluride (PVDF), or a polypropylene, an elastomer, or a rubber.

The component including essentially aluminum may have a ductility of at least 3%.

At least one of the components may include aluminum in the 2000 or 7000 series with ductility between 6 and, 20% and preferably, between 10 and 20%.

At least one of the components may include aluminum in the 5000 or 6000 series and ductility of at least 6%.

The hose according to the invention may include a carcass, a sheath, or a reinforcement, with the carcass comprising interlocked strip or interlocked wire, particularly Zeta wire, and with the reinforcement having an element which is a profile, a cable, or a wire.

This interlocked strip or wire of the carcass may include an aluminum alloy of the 2000, 3000, 4000, 5000, 6000, or 7000 series and/or said elongated element of the reinforcement may include an aluminum alloy in the 2000, 5000, 6000, or 7000 series.

The carcass may be steel strip or interlocked wire and the reinforcement may include steel.

The tensile-strength reinforcement may comprise essentially steel and the pressure-strength reinforcement may comprise essentially an aluminum alloy.

The hose according to the invention may comprise an anti-friction sheath which may, preferably, be watertight and an electrical insulator, with this sheath being disposed between the vault and the tensile-strength reinforcement.

The hose according to the invention may include a tensile-strength reinforcement having at least two layers of wire, cable, or profile as well as a layer or sheath of anti-friction material inserted between the at least two layers.

The tensile-strength reinforcement and the pressure-strength reinforcement may include essentially an aluminum alloy in the 2000, 5000, 6000, or 7000 series.

The hose according to the invention may comprise an external strip or external interlockable wire, which may include aluminum.

The hose according to the invention may comprise at least one internal sheath comprising a plastic material such as a polyamide, a PVDF, or an elastic material such as synthetic rubbers or elastomers.

The hose according to the invention may comprise a pressure-resistance reinforcement having at least one ply formed from a profile that may have a cross section of an interlocked section such as a Zeta or a U made from an aluminum alloy in the 2000, 5000, 6000, or 7000 series.

The hose according to the invention may include a composite material with an organic matrix, particularly for making an elongated element.

The terms used to designate the metallurgical states and heat and mechanical treatments of the aluminum alloys are defined in French Standards NF 02 006 and NF 02 011.

Namely:
state F: crude manufacturing state,
state 0: annealed,
state H: work hardened and possibly partially softened,
state T: hardened by heat treatment—heat treatment considered as combinations of all or part of the following treatments: dissolution, hardening, age-hardening, tempering with possible applications of plastic deformations.

Of course, in the present invention, the elongated elements for which it is proposed to use an aluminum alloy generally have a mechanical function. They may sometimes have an additional function because of their anti-rust characteristics.

The first prototypes showed that hoses comprising aluminum structural elements could be made without particular difficulty by comparison with known steel-reinforced hoses. In particular, it was found that, in the case of solid profiles with relatively complex cross sections of the "profile wire" type such as Zeta wires, manufacture of such aluminum profiles is easier and less expensive than in the case of the carbon steels currently used in the high-performance hoses targeted principally by the invention.

It has also been found that the use of aluminum allows wires or profiles, including Zeta-type profiles, to be made without difficulty in far larger cross-section sizes than was possible in practice with steel. This is due in particular to the fact that steel wires and profiles are made from "machine wire" whose diameter is limited to about 20 mm with the present status of equipment and manufacturing methods employed by the various vendors.

Under these conditions, the manufacture of Zeta wires, for example, is limited to a maximum thickness of approximately 10 mm in the case of steel. On the other hand, in the case of aluminum, there are no size limitations since manufacturing ranges vary. It was found, for example, that Zeta wires can be made without difficulty in thicknesses up to 160 or 200 mm.

The advantage offered by the possibility of making aluminum profiles with large thicknesses is, in particular, that a pressure reinforcement can be made with a single layer of thick Zeta wires in cases where, with high internal pressure and relatively large diameters, the necessary thickness would exceed the maximum thickness possible with steel. Thus, a steel pressure reinforcement must be made by superimposing two layers of wire, for example, an inner layer of zeta wires and an outer layer of rectangular wrap wires, with a substantially increased manufacturing cost that aluminum avoids.

Moreover, the possibility of making thick Zeta wires using aluminum has in certain cases the advantage of being able to wind the hose on smaller radii without risk of separation.

BRIEF DESCRIPTION OF THE DRAWINGS

The present invention will be better understood and its advantages will emerge more clearly from the following description of non-limitative examples illustrated in the accompanying drawings, wherein.

DETAILED DESCRIPTION

Figure 1:
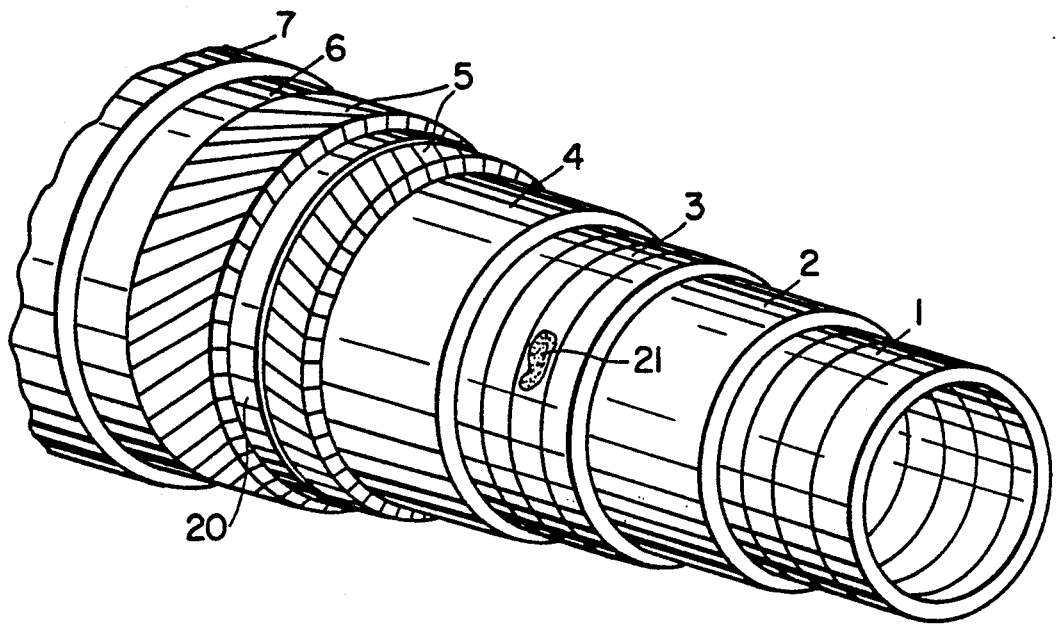
FIG. 1 is a perspective view of a hose structure with an inner carcass of interlocked strip or interlocked or hooked wires, a sealing sheath, a layer of interlocked or hooked wires, an inner sheath, reinforcements, a band, then an outer sheath.

Examples 1 to 13 described more fully hereinbelow relate to a hose made with the configuration shown in FIG. 1, this is, a hose having, in succession, an inner interlocked carcass 1 which may be made of strip interlocked by bending or hooked or interlocked wire, or designed to prevent the pipe from being crushed by external forces, whether distributed or undistributed, the term used by the engineers being "to avoid collapse," a Rilsan sheath 2, a layer of zeta-shaped interlocked wire or hookable profile (FIGS. 3 or 4), an inner Rilsan sheath 4, reinforcements 5 disposed at an angle of 35° with respect to the axis of the hose, a band 6, then an outer Rilsan sheath 7. The sheath 4 may be of the sealing or non-sealing type.

The mechanical characteristics are expressed in maximum tensile strength: Rm in MPa, in elasticity limit at 0.2% elongation: Re in MPa, and in % elongation over 50 mm: A %.

The tables given in the examples described hereinbelow have the following column headings, left to right:
Numbering of layers,
Description, type, and dimension (in mm) of layers,
Rm in MPa,
kg/m = weight in kg per meter of hose,
ID = inside diameter in mm,
Th = thickness of layer in mm,
The buoyancy factor is defined by:

$$\frac{\text{empty weight in air (kg/m)}}{\text{external volume (l/m)} \times 1.02 \text{ (density of sea water)}}$$

The axial damage limit load given in the tables as "tensile failure limit" is defined in the theoretical case of a rectilinear hose subjected to an axial tensile force only.

The "theoretical laying depth" given in the table is a limit determined here as being equal to the "tensile failure limit" divided by the linear weight of the hose filled with water in water. Since the hose is normally full of water when laid, this value corresponds to the length of the hose suspended from the surface, so that the total apparent weight of the hose would be equal to the theoretical axial load corresponding to the failure limit of the hose assumed to be rectilinear. This theoretical value allows the order of magnitude of the maximum acceptable water depth in practice to be calculated taking into account:

an adequate safety factor. With the present state of the art, particularly with the various applicable regulations, this safety factor is currently equal to two;

various factors depending on the laying operations, which have the effect of increasing the stresses on the elements of which the hose structure is composed by comparison to the reference case of a rectilinear hose subjected merely to an axial load.

These overload factors may be divided into two categories:

Maneuvering the hose from the surface increases the stresses at the point where the hose is held by the laying equipment, which may be of two types: winch (use limited to the case of large loads associated with great water depths), capstan, tracked tensioners (two- or three-track), or any type of linear winch associated with a system for gripping the hose to accept the axial load, and also, in general, at least one zone (or simply a fixed support shaped like an incurved gutter) to ensure that the hose glides overboard.

The dynamic forces caused by movements, a floating support used for laying depending on sea conditions considered may be expressed in terms of vertical acceleration in the form of a factor to increase the apparent weight.

Thus, as already stated, the order of magnitude of the maximum acceptable water depth for laying as a function of the failure limit under the effect of the weight of the hose may be evaluated, as a summary estimate, from the "theoretical laying depth" given in the tables by dividing the latter by a total reduction factor which takes into account both the safety factor and the overload factors linked to laying operations which may vary from 1 to 2 depending on the circumstances, for example, handling of the hose by the laying equipment and accelerations of the floating support. In practice, the total factor used to reduce the acceptable load defined in this way may range from a little over 2 in the most favorable cases to a maximum which may be over 4.

In order to interpret the theoretical reference values given in the tables in a simple and concrete fashion, an average standard value of 3 may be adopted for this factor, which allows the respective performances of the various hoses cited in the examples described below to be compared, although the maximum water depth thus determined has only very approximate significance in absolute terms for a given hose. However this may be, the theoretical figures given in the tables below allow the various examples to be compared with each other.

The "collapse pressure" mentioned in the tables below corresponds to the crushing strength of the hose when subjected to external hydrostatic pressure determined by the depth of the water. Because the structure is calculated on the basis of the hypothesis that the annular space may be subjected to external pressure, for example, the outer sheath accidentally pierced, this value is conditioned by the crushing strength of the interior carcass in the case of rough bore type hoses which are described here as examples.

The maximum water depth acceptable for a hose may be determined directly from the standpoint of its resistance to external pressure, by applying, to the "collapse pressure" translated into water depth (pressure of hydrostatic column as a function of sea water density) a safety factor of 1.5 which corresponds to currently applicable regulations.

Evaluation of the maximum water depth is acceptable for a hose as described in the examples below.

The summary evaluation method set forth allows, at the level of relative values, the order of magnitude of the respective performances of the various hoses compared to be estimated, it being understood that the absolute depth value acceptable for each of them may vary considerably according to circumstances.

The mechanical properties indicated for the structural elements of the hoses described in the examples below relate to the condition of the aluminum structural elements, once the last of the successive heat and/or mechanical treatments specified for each example have been accomplished, i.e. at the time they are wound onto a drum ready to be installed on the machine used for making the hose (wrapper, winder, etc.).

Since the various elements of the metal reinforcement of the hoses in the invention are, in general, installed in the hose such that they are in the helical configuration imposed by the geometry of the hose and the wrapping angle without having to undergo substantial residual stresses, i.e. they are laid and wound by plastic deformation and not elastic deformation, these elements must then undergo a supplementary cold-forming operation. This applies both to the case in which the strips to be formed by bending in the shaping tools of the winder (see, for example, FR-2,555,920) and to the case, for example, of the reinforcement wire pre-formation operations described in FR-2,528,733.

Work hardening of metal implied by the latter operation of cold deformation to modify the mechanical properties as mentioned in the examples. One result is an increase in the elastic limit which may in certain cases be non-negligible, principally when the aluminum element to be installed in the hose-making machine is in the annealed state. The practical consequence of this situation is that the values characterizing the mechanical strength of the hoses are minimal. The actual values may, in certain cases, be more or less higher than the values mentioned here in the examples.

Example 1 relates to an optimized hose that has no aluminum.

EXAMPLE NO. 1

A hose with an inside diameter of 8" (203.2 mm) is made, having an inner carcass made of AISI 304 stainless steel strip 2 mm thick, $Rm=540$ MPa, $Re=450$ MPa, an inner Rilsan sheath 6 mm thick, an interlocked Zeta wire layer 6.2 mm thick made with FM 15 steel with the characteristics: $Rm=780$ MPa, $A=2.5\%$, of two layers of reinforcements at an angle of 35° made with an FM 15 steel [and] an outer Rilsan sheath 7 mm thick.

This hose, formed in this way, has the following characteristics:

Example 1

| Description | Rm MPa | kg/m | ID mm | Th. m |
|---|---|---|---|---|
| 1. Stainless steel carcass 304 80 × 2 mm | 540 | 31 | 203.2 | 10.0 |
| 2. Inner Rilsan sheath | | 4.9 | 223.2 | 6.0 |
| 3. Zeta FM 14 thickness: 6.2 mm | 780 | 31.2 | 235.2 | 6.2 |
| 4. Inner Rilsan sheath | | 5 | 247.6 | 6.0 |
| 5. Reinforcements with 35° FM15 thickness: 2.5 mm | 780 | 30.0 | 259.6 | 5.0 |
| 6. Band | | 0.5 | 269.6 | 0.75 |
| 7. Outer Rilsan sheath | | 6.4 | 271.1 | 7.0 |

| Characteristic | U.S. Unit | Metric Unit |
|---|---|---|
| Inside diameter | 8.00" | 203.20 mm |
| Outside diameter | 11.22" | 285.10 mm |
| Inside volume | 0.379 cf/ft | 35.18 l/m |
| Outside volume | 0.687 cf/ft | 63.84 l/m |
| Empty weight in air | 73.2 lb/ft | 108.9 kg/m |
| Weight filled with sea water in air | 97.4 | 144.9 kg/m |
| Empty weight in the sea | 29.2 lb/ft | 43.4 kg/m |
| Weight filled with sea water in the sea | 53.4 lb/ft | 79.5 kg/m |
| Buoyancy factor empty in the sea | | 1.66 |
| Burst pressure | 5350 psi | 369 bars |
| Collapse pressure | 1570 psi | 108 bars |
| Tensile strength to failure | 382,685 lbs | 170,250 daN |
| Theoretical laying depth | | 2,141 m |

As already stated, this hose is optimized in its design and the materials used.

EXAMPLE NO. 2

A hose like that of Example No. 1 is made, but in layer 3 the interlocked Zeta wire 6.2 mm thick made of FM15 steel is replaced by an interlocked Zeta wire 8 mm thick made of aluminum alloy 7049 in state T6 with mechanical characteristics Rm=620 MPa, A=10%.

This hose has the following characteristics:

Example 2

| Description | Rm MPa | kg/m | ID mm | Th. m |
|---|---|---|---|---|
| 1. Stainless steel carcass 304 80 × 2 mm | 540 | 31 | 203.2 | 10.0 |
| 2. Inner Rilsan sheath | | 4.9 | 223.2 | 6.0 |
| 3. Zeta aluminum thickness: 8.0 mm | 620 | 14.3 | 235.2 | 8.0 |
| 4. Inner Rilsan sheath | | 5 | 251.2 | 6.0 |
| 5. Reinforcements with thickness: 2.5 mm | 780 | 30.5 | 263.2 | 5.0 |
| 6. Band | | 0.5 | 273.2 | 0.75 |
| 7. Outer Rilsan sheath | | 6.4 | 274.7 | 7.0 |

| Characteristic | U.S. Unit | Metric Unit |
|---|---|---|
| Inside diameter | 8.00" | 203.20 mm |
| Outside diameter | 11.37" | 288.70 mm |
| Inside volume | 0.379 cf/ft | 35.18 l/m |
| Outside volume | 0.705 cf/ft | 65.46 l/m |
| Empty weight in air | 62.3 lb/ft | 92.6 kg/m |
| Weight filled with sea water in air | 86.5 | 128.7 kg/m |
| Empty weight in the sea | 17.2 lb/ft | 25.5 kg/m |
| Weight filled with sea water in the sea | 41.4 lb/ft | 61.6 kg/m |
| Buoyancy factor empty in the sea | | 1.38 |
| Burst pressure | 5386 psi | 371 bars |
| Collapse pressure | 1570 psi | 108 bars |
| Tensile strength to failure | 388,638 lbs | 172,898 daN |
| Theoretical laying depth | | 2,806 m |

It can be seen that at performance levels equivalent to those of the all-steel hose described in Example No. 1, the weight of the hose filled with sea water in sea water is 22.5% less, and the theoretical laying depth has increased from 2,141 m to 2,868 m.

A hose with substantially equivalent mechanical characteristics may be obtained by replacing alloy 7049 in state T6 with a 7178 alloy in state T6 or preferably in state T76 (double tempering of 3 hours at 116°-127° C. and 15 hours at 157°-160° C.) which improves its resistance to corrosion under tension, by a 7075 alloy in state T6 or a 7001 alloy in state T73 (double tempering treatment), a 7175 alloy in state T66, or a 7475 alloy in state T6.

EXAMPLE NO. 3

A hose like that of Example No. 1 is made, but in layer 3 the interlocked Zeta wire 6.2 mm thick made of FM15 steel is replaced by an interlocked Zeta wire 10 mm thick made of aluminum alloy 2017A in state T3 which has undergone work hardening before hardening (15%) with mechanical characteristics Fm=500 MPa, A=9%. Under these conditions, the characteristics of the hose obtained are the following:

Example 3

| Description | Rm MPa | kg/m | ID mm | Th. m |
|---|---|---|---|---|
| 1. Stainless steel carcass 304 80 × 2 mm | 540 | 31.0 | 203.2 | 10.0 |
| 2. Inner Rilsan sheath | | 4.9 | 223.2 | 6.0 |
| 3. Zeta aluminum thickness: 10 mm | 500 | 17.4 | 235.2 | 10.0 |
| 4. Inner Rilsan sheath | | 5.1 | 251.2 | 6.0 |
| 5. Reinforcements with 35° FM15 thickness: 2.5 mm | 780 | 31.0 | 267.2 | 5.0 |
| 6. Band | | 0.5 | 277.2 | 0.75 |
| 7. Outer Rilsan sheath | | 6.5 | 278.7 | 7.0 |

| Characteristic | U.S. Unit | Metric Unit |
|---|---|---|
| Inside diameter | 8.00" | 203.20 mm |
| Outside diameter | 11.52" | 292.70 mm |
| Inside volume | 0.379 cf/ft | 35.18 l/m |
| Outside volume | 0.724 cf/ft | 67.29 l/m |
| Empty weight in air | 64.8 lb/ft | 96.3 kg/m |
| Weight filled with sea water in air | 89.0 | 132.4 kg/m |
| Empty weight in the sea | 18.4 lb/ft | 27.4 kg/m |
| Weight filled with sea water in the sea | 42.6 lb/ft | 63.4 kg/m |
| Buoyancy factor empty in the sea | | 1.40 |
| Burst pressure | 5398 psi | 372 bars |
| Collapse pressure | 1570 psi | 108 bars |
| Tensile limit failure | 392,805 lbs | 174,752 daN |
| Theoretical laying depth | | 2,756 m |

It can be seen that, for identical burst pressure and collapse pressure characteristics, this hose when full of sea water in water is 20.2% lighter than the all-steel hose of Example No. 1 and the theoretical laying depth is 2756 m instead of 2140 m.

A hose with substantially equivalent characteristics may be made by using alloy 2017A in state T4 following by final work hardening of 15% or using alloys 2014, 2024, and 2618A in the same states as 2017A.

A hose with identical characteristics may also be obtained by using certain aluminum alloys of the 7000 series; these are alloys 7075, 7050, preferably in states T73 or T76, which gives them good corrosion resistance, possibly followed by final work hardening, 5 to 20% (state T73X).

EXAMPLE NO. 4

A hose like that of Example No. 1 is made, but in layer 3 the interlocked Zeta wire 6.2 mm thick made of FM15 steel is replaced by an interlocked Zeta wire 12 mm thick made of aluminum alloy 6061 in state T8, with mechanical characteristics Rm=410 MPa, A=15. The characteristics of the hose thus obtained are the following:

| Example 4 | | | | |
|---|---|---|---|---|
| Description | Rm MPa | kg/m | ID mm | Th. m |
| 1. Stainless steel carcass 304 80 × 2 mm | 540 | 31.0 | 203.2 | 10.0 |
| 2. Inner Rilsan sheath | | 4.9 | 223.2 | 6.0 |
| 3. Zeta aluminum thickness: 12.0 mm | 410 | 20.8 | 235.2 | 12.0 |
| 4. Inner Rilsan sheath | | 5.2 | 259.2 | 6.0 |
| 5. Reinforcements with 35° FM15 thickness: 2.5 mm | 780 | 31.3 | 271.2 | 5.0 |
| 6. Band | | 0.5 | 281.2 | 0.75 |
| 7. Outer Rilsan sheath | | 6.6 | 282.7 | 7.0 |
| Characteristic | U.S. Unit | | Metric Unit | |
| Inside diameter | 8.00" | | 203.20 mm | |
| Outside diameter | 11.68" | | 296.70 mm | |
| Inside volume | 0.379 cf/ft | | 35.18 l/m | |
| Outside volume | 0.744 cf/ft | | 69.14 l/m | |
| Empty weight in air | 67.2 lb/ft | | 100.0 kg/m | |
| Weight filled with sea water in air | 91.4 | | 136.1 kg/m | |
| Empty weight in the sea | 19.6 lb/ft | | 29.2 kg/m | |
| Weight filled with sea water in the sea | 43.8 lb/ft | | 65.2 kg/m | |
| Buoyancy factor empty in the sea | | | 1.41 | |
| Burst pressure | 5386 psi | | 371 bars | |
| Collapse pressure | 1570 psi | | 108 bars | |
| Tensile limit failure | 412,147 lbs | | 183,357 daN | |
| Theoretical laying depth | | | 2,812 m | |

It can be seen that, at performances equivalent to the burst pressure and collapse pressure, the weight of the hose filled with sea water in sea water has been reduced by 18%, and the theoretical laying depth is 2812 m.

A hose with equivalent mechanical characteristics and equivalent weights may be made by replacing alloy 6061 which may be used in state T8 or state T6 or T9 by alloys in the 6000 series: alloys 6063 or 6082 used in the same states as 6061.

A hose with equivalent mechanical characteristics may also be obtained with alloys in the 5000 series particularly alloy 5056 in state H3X, i.e. having undergone annealing to strengthen it against corrosion at 230°–240° C. followed by work hardening or in state H1 and alloy 5082 in state H1.

EXAMPLE NO. 5

A hose like that of Example No. 1 is made, but the Zeta layer 6.2 mm thick made of FM15 steel is replaced by an Zeta layer 14 mm thick made of alloy 5082 in state H1 with final work hardening of 25% and mechanical characteristics Rm=350 MPa, A=13%.

Under these conditions, the characteristics of the hose are the following:

| Example 5 | | | | |
|---|---|---|---|---|
| Description | Rm MPa | kg/m | ID mm | Th. m |
| 1. Stainless steel 304 carcass 80 × 2 mm | 540 | 31.0 | 203.2 | 10.0 |
| 2. Inner Rilsan sheath | | 4.9 | 223.2 | 6.0 |
| 3. Zeta aluminum thickness: 14.0 mm | 350 | 24.4 | 235.2 | 14.0 |
| 4. Inner Rilsan sheath | | 5.3 | 263.2 | 6.0 |
| 5. Reinforcements at 35° FM15 thickness: 2.5 mm | 780 | 31.9 | 275.2 | 5.0 |
| 6. Band | | 0.5 | 285.2 | 0.75 |
| 7. Outer Rilsan sheath | | 6.7 | 286.7 | 7.0 |
| Characteristic | U.S. Unit | | Metric Unit | |
| Inside diameter | 8.00" | | 203.20 mm | |
| Outside diameter | 11.84" | | 300.70 mm | |
| Inside volume | 0.379 cf/ft | | 35.18 l/m | |
| Outside volume | 0.764 cf/ft | | 71.02 l/m | |
| Empty weight in air | 70.3 lb/ft | | 104.7 kg/m | |
| Weight filled with sea water in air | 94.6 | | 140.8 kg/m | |
| Empty weight in the sea | 21.5 lb/ft | | 32.0 kg/m | |
| Weight filled with sea water in the sea | 45.7 lb/ft | | 68.0 kg/m | |
| Buoyancy factor empty in the sea | | | 1.44 | |
| Burst pressure | 5386 psi | | 371 bars | |
| Collapse pressure | 1570 psi | | 108 bars | |
| Tensile strength to failure | 419,965 lbs | | 186,835 daN | |
| Theoretical laying depth | | | 2,747 m | |

In can be seen that the use of aluminum alloy Zeta 1.4 mm thick lightens the hose filled with sea water in the sea by 14.5% by comparison with the hose of Example No. 1, and that the theoretical laying depth is 2747 m.

A hose with identical mechanical characteristics may be made by replacing alloy 5082 with alloys 5086, 5154, 5754, or 5052 in state H1 or by alloys 6005A, 6081, 6181, 6351, 6060, 6066, pr 6070 in state H, T4, or T6 or T8 or T9, or alloy 7020 in state T6.

EXAMPLE NO. 6

A hose like that of Example No. 1 is made, but layer 3 of FM15 steel Zeta wire 6.2 mm thick is replaced by a Zeta layer 16 mm thick made of aluminum alloy 5052 in state H1 with final work hardening of 45% and mechanical characteristics Rm=310 MPa, A %=9.

Under these conditions, the characteristics of the hose are the following:

| Example 6 | | | | |
|---|---|---|---|---|
| Description | Rm MPa | kg/m | ID mm | Th. m |
| 1. Stainless steel 304 carcass 80 × 2 mm | 540 | 31.0 | 203.2 | 10.0 |
| 2. Inner Rilsan sheath | | 4.9 | 223.2 | 6.0 |
| 3. Zeta aluminum thickness: 16.0 mm | 310 | 28.4 | 235.2 | 16.0 |
| 4. Inner Rilsan sheath | | 5.4 | 267.2 | 6.0 |
| 5. Reinforcements at 35° FM15 thickness: 2.5 mm | 780 | 32.3 | 279.2 | 5.0 |
| 6. Band | | 0.5 | 289.2 | 0.75 |
| 7. Outer Rilsan sheath | | 6.8 | 290.7 | 7.0 |
| Characteristic | U.S. Unit | | Metric Unit | |
| Inside diameter | 8.00" | | 203.20 mm | |
| Outside diameter | 12.00" | | 304.70 mm | |
| Inside volume | 0.379 cf/ft | | 35.18 l/m | |
| Outside volume | 0.785 cf/ft | | 72.92 l/m | |
| Empty weight in air | 73.3 lb/ft | | 109.2 kg/m | |
| Weight filled with sea water in air | 97.6 | | 145.2 kg/m | |
| Empty weight in the sea | 23.1 lb/ft | | 34.4 kg/m | |
| Weight filled with sea water in the sea | 47.4 lb/ft | | 70.5 kg/m | |
| Buoyancy factor empty in | | | 1.46 | |

-continued

| Example 6 | | | |
|---|---|---|---|
| the sea | | | |
| Burst pressure | 5386 psi | 371 bars | |
| Collapse pressure | 1570 psi | 108 bars | |
| Tensile strength to failure | 423,475 lbs | 188,397 daN | |
| Theoretical laying depth | | 2,672 m | |

It can be seen that, for identical burst pressure and collapse pressure characteristics, this hose is 11.3% lighter and the theoretical laying depth is 2672 m.

A hose with substantially equivalent characteristics may be obtained by replacing alloy 5052 by alloys 2017, 2117, 5050, 5154, or 5754 in state H1, or alloys 5056, 5082, 5086, and 5183 in state F or H.

EXAMPLE NO. 7

A hose like that described in Example No. 1 is made, but layer No. 1 composed of an internal AISI 304 stainless steel strip carcass 2 mm thick is replaced by an aluminum alloy 5052 strip in state H1, 3.5 mm thick, with $Rm = 320$ MPa and $Re = 290$ MPa.

Under these conditions, the characteristics of the hose obtained are the following:

| Example 7 | | | | |
|---|---|---|---|---|
| Description | Rm MPa | kg/m | ID mm | Th. m |
| 1. Aluminum strip carcass 140 × 3.5 mm | 320 | 19.3 | 203.2 | 17.5 |
| 2. Inner Rilsan sheath | | 5.2 | 238.2 | 6.0 |
| 3. Zeta FM15 thickness: 6.7 mm | 780 | 35.8 | 250.2 | 6.7 |
| 4. Inner Rilsan sheath | | 5.3 | 263.6 | 6.0 |
| 5. Reinforcements at 35° FM15 thickness: 2.5 mm | 780 | 31.8 | 275.6 | 5.0 |
| 6. Band | | 0.5 | 285.6 | 0.75 |
| 7. Outer Rilsan sheath | | 6.7 | 287.1 | 7.0 |
| Characteristic | U.S. Unit | | Metric Unit | |
| Inside diameter | 8.00" | | 203.20 mm | |
| Outside diameter | 11.85" | | 301.10 mm | |
| Inside volume | 0.403 cf/ft | | 37.41 l/m | |
| Outside volume | 0.766 cf/ft | | 71.21 l/m | |
| Empty weight in air | 70.2 lb/ft | | 104.5 kg/m | |
| Weight filled with sea water in air | 96.0 | | 142.9 kg/m | |
| Empty weight in the sea | 21.5 lb/ft | | 32.0 kg/m | |
| Weight filled with sea water in the sea | 47.3 lb/ft | | 70.4 kg/m | |
| Buoyancy factor empty in the sea | | | 1.43 | |
| Burst pressure | 5365 psi | | 370 bars | |
| Collapse pressure | 4130 psi | | 106 bars | |
| Tensile strength to failure | 407,937 lbs | | 181,484 daN | |
| Theoretical laying depth | | | 2,578 m | |

It can be seen that, for burst pressure and collapse pressure characteristics equivalent to those of the hose of Example 1, the lightness gain is 11.4% and the theoretical laying depth is 2,578 meters.

A hose with identical characteristics is obtained whatever the grade and state of the aluminum used for making the inner carcass; it is preferable to use alloys with the best corrosion resistance, notably alloys 1100, 1180, 3003, 5052, 5056, 5083, 5456, 6060, 6061, 6082, 6083, 6106. Alloys in the 2000 series and 7000 series may also be used.

EXAMPLE NO. 8

A hose like that described in Example No. 1 is made, but layer No. 1 composed of an internal AISI 304 stainless steel strip carcass 2 mm thick is replaced by a carcass of aluminum alloy Al 3103 Zeta wire 12 mm thick in state H1, with $Rm = 250$ MPa and $Re = 220$ MPa. The thickness of the FM steel Zeta wire is 6.4 mm.

Under these conditions, the characteristics of the hose obtained are the following:

| Example 8 | | | | |
|---|---|---|---|---|
| Description | Rm MPa | kg/m | ID mm | Th. m |
| 1. Zeta aluminum carcass thickness: 12.0 mm | 250 | 18.6 | 203.2 | 12.0 |
| 2. Inner Rilsan sheath | | 4.6 | 227.2 | 6.0 |
| 3. Zeta FM15 thickness: 6.4 mm | 780 | 32.7 | 239.2 | 6.4 |
| 4. Inner Rilsan sheath | | 5.1 | 252.0 | 6.0 |
| 5. Reinforcements at 35° FM15 thickness: 2.5 mm | 780 | 30.6 | 264.0 | 5.0 |
| 6. Band | | 0.5 | 274.0 | 0.75 |
| 7. Outer Rilsan sheath | | 6.5 | 275.6 | 7.0 |
| Characteristic | U.S. Unit | | Metric Unit | |
| Inside diameter | 8.00" | | 203.20 mm | |
| Outside diameter | 11.40" | | 289.50 mm | |
| Inside volume | 0.349 cf/ft | | 32.43 l/m | |
| Outside volume | 0.709 cf/ft | | 65.82 l/m | |
| Empty weight in air | 66.2 lb/ft | | 98.5 kg/m | |
| Weight filled with sea water in air | 88.6 | | 131.8 kg/m | |
| Empty weight in the sea | 21.1 lb/ft | | 31.3 kg/m | |
| Weight filled with sea water in the sea | 43.4 lb/ft | | 64.5 kg/m | |
| Buoyancy factor empty in the sea | | | 1.46 | |
| Burst pressure | 5428 psi | | 374 bars | |
| Collapse pressure | 1768 psi | | 122 bars | |
| Tensile strength to failure | 391,495 lbs | | 174,169 daN | |
| Theoretical laying depth | | | 2,700 m | |

It can be seen that, for a burst pressure identical to that of Example No. 1, the use of an inner carcass made of aluminum alloy 12 mm Zeta wire allowed the collapse pressure to be raised to 122 bars, the lightness gain is 18.8%, and the theoretical laying depth is 2,697 meters. Alloy Al 3103 may be replaced by any other alloy in the 1000, 2000, 3000, 4000, 5000, 6000, or 7000 series.

EXAMPLE NO. 9

An 8" hose like that described in Example No. 1 is made, but, in layer No. 3, the 6.2 mm FM15 steel Zeta wire is replaced by a 10 mm thick Zeta wire made of alloy 2017 in state T4 that has undergone 10% final work-hardening and has the characteristics $Rm = 510$ MPa, $A = 8\%$. Also, in layer 4, the FM15 steel reinforcements are replaced by reinforcements 4 mm thick made of aluminum alloy 6061 in state T9 with 8% final work-hardening after tempering and $Rm = 450$ MPa and $A = 6\%$.

The hose thus formed has the following characteristics:

| Example 9 | | | | |
|---|---|---|---|---|
| Description | Rm MPa | kg/m | ID mm | Th. m |
| 1. Stainless steel strip 304 carcass 80 × 2 mm | 540 | 31.0 | 203.2 | 10.0 |
| 2. Inner Rilsan sheath | | 4.9 | 223.2 | 6.0 |
| 3. Zeta aluminum thickness: 10.0 mm | 510 | 17.4 | 235.2 | 10.0 |
| 4. Inner Rilsan sheath | | 5.1 | 255.2 | 6.0 |
| 5. Reinforcements at 35° aluminum thickness: 4.0 mm | 450 | 17.1 | 267.2 | 8.0 |

Example 9 (continued)

| | | | | |
|---|---|---|---|---|
| 6. | Band | | 0.5 | 283.2 | 0.75 |
| 7. | Outer Rilsan sheath | | 6.7 | 284.7 | 7.0 |

| Characteristic | U.S. Unit | Metric Unit |
|---|---|---|
| Inside diameter | 8.00" | 203.20 mm |
| Outside diameter | 11.76" | 298.70 mm |
| Inside volume | 0.379 cf/ft | 35.18 l/m |
| Outside volume | 0.704 cf/ft | 70.70 l/m |
| Empty weight in air | 55.6 lb/ft | 82.7 kg/m |
| Weight filled with sea water in air | 79.8 | 118.7 kg/m |
| Empty weight in the sea | 7.3 lb/ft | 10.8 kg/m |
| Weight filled with sea water in the sea | 31.5 lb/ft | 46.9 kg/m |
| Buoyancy factor empty in the sea | | 1.15 |
| Burst pressure | 5386 psi | 371 bars |
| Collapse pressure | 1570 psi | 108 bars |
| Tensile strength to failure | 315,318 lbs | 157,813 daN |
| Theoretical laying depth | | 3,365 m |

It can be seen that the use of aluminum alloys in layers 3 and 4 gives a weight advantage by comparison with hose 1 of 41% for identical performance values, and the theoretical laying depth increases from 2140 m to 2991 meters.

EXAMPLE NO. 10:

An 8" hose identical to that of Example No. 1 is made, but the FM15 steel is replaced by aluminum alloys.

The inner AISI 304 stainless steel strip carcass is replaced by a 12 mm Zeta wire inner carcass made of alloy 6061 in state T4 then work-hardened 20%, with Rm=350 MPa and Re=320 MPa; in layer No. 3 the 6.2 mm FM15 steel Zeta wire is replaced by a 10 mm thick Zeta wire made of alloy 2017 in state T3, 15% work-hardened before hardening (Rm=510) and in layer No. 4 the reinforcement steel wires are replaced by reinforcement wires 4 mm thick made of alloy 2017 in the same state as the Zeta wire in layer 3.

The characteristics of the hose thus obtained are the following:

Example 10

| Description | Rm MPa | kg/m | ID mm | Th. m |
|---|---|---|---|---|
| 1. Zeta aluminum thickness: 12.0 mm | 350 | 18.6 | 203.2 | 12.0 |
| 2. Inner Rilsan sheath | | 4.6 | 227.2 | 6.0 |
| 3. Zeta aluminum thickness: 10.0 mm | 510 | 17.7 | 239.2 | 10.0 |
| 4. Inner Rilsan sheath | | 5.2 | 259.2 | 6.0 |
| 5. Reinforcements at 35° aluminum thickness: 4.0 mm | 510 | 17.3 | 271.2 | 8.0 |
| 6. Band | | 0.5 | 287.2 | 0.75 |
| 7. Outer Rilsan sheath | | 6.8 | 288.7 | 7.0 |

| Characteristic | U.S. Unit | Metric Unit |
|---|---|---|
| Inside diameter | 8.00" | 203.20 mm |
| Outside diameter | 11.92" | 302.70 mm |
| Inside volume | 0.349 cf/ft | 32.43 l/m |
| Outside volume | 0.775 cf/ft | 71.96 l/m |
| Empty weight in air | 42.4 lb/ft | 70.6 kg/m |
| Weight filled with sea water in air | 69.8 | 103.9 kg/m |
| Empty weight in the sea | −2.1 lb/ft | −3.1 kg/m |
| Weight filled with sea water in the sea | 20.2 lb/ft | 30.1 kg/m |
| Buoyancy factor empty in the sea | | 0.96 |
| Burst pressure | 5500 psi | 370 bars |
| Collapse pressure | 1768 psi | 122 bars |
| Tensile strength to failure | 417,895 lbs | 185,915 daN |
| Theoretical laying depth | | 6,176 m |

It can be seen that this hose, which has the same burst pressure as hose No. 1, is 62.1% lighter, the collapse pressure is over 122 bars, and the theoretical laying depth is 6176 meters.

EXAMPLE NO. 11

A hose identical to that of Example No. 10 is made, but in layer No. 1 the 12 mm Zeta wire is replaced by a Zeta wire 14 mm thick.

The characteristics of the hose thus obtained are the following:

Example 11

| Description | Rm MPa | kg/m | ID mm | Th. m |
|---|---|---|---|---|
| 1. Zeta aluminum thickness 14.0 mm | 350 | 21.2 | 203.2 | 14.0 |
| 2. Inner Rilsan sheath | | 4.6 | 231.2 | 6.0 |
| 3. Zeta aluminum thickness: 10 mm | 510 | 17.9 | 243.2 | 10.0 |
| 4. Inner Rilsan sheath | | 5.3 | 263.2 | 6.0 |
| 5. Reinforcements at 35° aluminum thickness: 4.0 mm | 510 | 17.7 | 275.2 | 8.0 |
| 6. Band | | 0.6 | 291.2 | 0.75 |
| 7. Outer Rilsan sheath | | 6.9 | 292.7 | 7.0 |

| Characteristic | U.S. Unit | Metric Unit |
|---|---|---|
| Inside diameter | 8.00" | 203.20 mm |
| Outside diameter | 12.07" | 306.70 mm |
| Inside volume | 0.349 cf/ft | 32.43 l/m |
| Outside volume | 0.795 cf/ft | 73.88 l/m |
| Empty weight in air | 49.8 lb/ft | 74.1 kg/m |
| Weight filled with sea water in air | 72.1 lb/ft | 107.4 kg/m |
| Empty weight in the sea | −1.1 lb/ft | −1.6 kg/m |
| Weight filled with sea water in the sea | 21.2 lb/ft | 31.6 kg/m |
| Buoyancy factor empty in the sea | | 0.98 |
| Burst pressure | 5413 psi | 370 bars |
| Collapse pressure | 2724 psi | 188 bars |
| Tensile strength to failure | 427,166 lbs | 190,038 daN |
| Theoretical laying depth | | 6,013 m |

It can be seen, by comparison to the hose in Example No. 10, that the collapse pressure is greatly increased: 188 bars instead of 122 bars; by comparison with the hose of Example 1 the weight advantage is 60.2% and the theoretical laying depth is 6013 meters.

EXAMPLE NO. 12

A hose identical to that of Example No. 11 is made, but in layer No. 1 the 14 mm thick Zeta wire is replaced by a 16 mm thick Zeta wire.

Under these conditions, the hose has the following characteristics:

TABLE 12

| Description | Rm MPa | kg/m | ID mm | Th. m |
|---|---|---|---|---|
| 1. Zeta aluminum carcass 16.0 mm | 350 | 24.8 | 203.2 | 16.0 |
| 2. Inner Rilsan sheath | | 4.7 | 235.7 | 6.0 |
| 3. Zeta aluminum thickness: 10 mm | 510 | 18.2 | 247.2 | 10 |
| 4. Inner Rilsan sheath | | 5.4 | 267.6 | 6.0 |
| 5. Reinforcements at | 510 | 17.9 | 279.2 | 8.0 |

TABLE 12-continued

|  |  | Rm MPa | kg/m | ID mm | Th. m |
|---|---|---|---|---|---|
|  | 35° aluminum thickness: 4.0 mm |  |  |  |  |
| 6. | Band |  | 0.6 | 295.2 | 0.75 |
| 7. | Outer Rilsan sheath |  | 6.9 | 296.7 | 7.0 |

| Characteristic | U.S. Unit | Metric Unit |
|---|---|---|
| Inside diameter | 8.00" | 203.20 mm |
| Outside diameter | 12.23" | 310.70 mm |
| Inside volume | 0.349 cf/ft | 32.43 l/m |
| Outside volume | 0.816 cf/ft | 75.82 l/m |
| Empty weight in air | 52.8 lb/ft | 78.50 kg/m |
| Weight filled with sea water in air | 75.1 lb/ft | 111.7 |
| Empty weight in the sea | +0.5 lb/ft | +0.8 kg/m |
| Weight filled with sea water in the sea | 22.9 lb/ft | 34.0 kg/m |
| Buoyancy factor empty in the sea |  | 1.01 |
| Burst pressure | 5365 psi | 370 bars |
| Collapse pressure | 3974 psi | 274 bars |
| Tensile strength to failure | 427,483 lbs | 190,180 daN |
| Theoretical laying depth |  | 5,593 m |

It can be seen, by comparison to Example No. 11, that the collapse pressure is greatly increased: 274 bars from 188 bars and 108 bars in the case of the hose of Example No. 1. By comparison with the hose of Example 1 the weight advantage is 57.2% and the theoretical laying depth is 5593 meters.

EXAMPLE NO. 13

A hose identical to that of Example No. 1 is made, but in layer No. 3 the 6.2 mm thick FM15 steel Zeta wire is replaced by a 10 mm thick Zeta wire made of aluminum alloy 2017 with mechanical characteristics RM=500 MPa and A=9%.

In addition, the FM15 steel reinforcements are replaced by 6 mm thick reinforcements made of composite with a fiberglass-reinforced organic matrix with mechanical characteristics Rm=2500 MPa.

The hose thus formed has the following characteristics:

| Example 13 |
|---|

| Description | Rm MPa | kg/m | ID mm | Th. m |
|---|---|---|---|---|
| 1. Stainless steel strip 304 carcass 80 × 2 mm | 540 | 31 | 203.2 | 10.0 |
| 2. Inner Rilsan sheath |  | 4.9 | 223.2 | 6.0 |
| 3. Zeta aluminum thickness: 10 mm | 500 | 17.4 | 235.2 | 10.0 |
| 4. Inner Rilsan sheath |  | 5.1 | 255.2 | 6.0 |
| 5. Reinforcements at 35° aluminum thickness: 6.0 mm | 2500 | 15.8 | 267.2 | 12.0 |
| 6. Band |  | 0.6 | 291.2 | 0.75 |
| 7. Outer Rilsan sheath |  | 6.9 | 292.7 | 7.0 |

| Characteristic | U.S. Unit | Metric Unit |
|---|---|---|
| Inside diameter | 8.00" | 203.20 mm |
| Outside diameter | 12.07" | 306.70 mm |
| Inside volume | 0.379 cf/ft | 35.18 l/m |
| Outside volume | 0.795 cf/ft | 73.88 l/m |
| Empty weight in air | 54.8 lb/ft | 81.6 kg/m |
| Weight filled with sea water in air | 79.1 lb/ft | 117.6 |
| Empty weight in the sea | 3.9 lb/ft | 5.9 kg/m |
| Weight filled with sea water in the sea | 28.2 lb/ft | 41.9 kg/m |
| Buoyancy factor empty in the sea |  | 1.08 |
| Burst pressure | 5365 psi | 370 bars |
| Collapse pressure | 1570 psi | 108 bars |
| Tensile strength to failure | 1,061,829 lbs | 472,301 daN |

| Example 13 |  |
|---|---|
| Theoretical laying depth | 11,272 m |

By comparison with the hose of Example No. 1, for identical burst pressure and collapse pressure characteristics, the weight advantage is 47% and the theoretical laying depth exceeds 10,000 meters.

As a result of the above applications, in the case of Example 1 it is possible, for purposes of approximation and specifically with the aim of making a comparison with the other examples, to evaluate the order of magnitude of the possible water depth as being about 713 m, with this value being the smaller of the two limitations that may be estimated directly from the information in the tables, = "theoretical maximum laying depth" = 2,140 m divided by 3, or 713 m, and "collapse pressure" = 1,115 divided by 1.5, or 743 m.

It will be recalled that the limitation on the weight of the hose as a function of its axial strength in particular may vary in reality from a factor of 1 to a factor of 2 depending on the circumstances.

If we apply the same evaluation to Example 12, the depth reached is higher than 18,000 meters.

In Examples 2 to 10 and 13, the above evaluation would lead to an underestimate of the laying depths. In these examples, the inner carcass is not sized to correspond to the laying pressure so that hoses can be compared with each other.

It should be noted that collapse occurs only if the outer sheath, which generally acts as a seal, is pierced and that, in addition, sheath 4 is non-sealing or has a leak.

Thus, if the hose does not have this leak, it is possible, in evaluating the installation depth, to take into account the theoretical laying depth and not the limitation given in the example.

The present invention applies to tubing with structures other than that shown in FIG. 1.

The present invention may apply in particular to hoses with an inner tube made of a plastic or elastomic material with or without carcass, etc.

Figure 2:
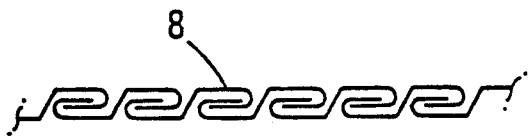
FIG. 2 is a schematic view of a piece of strip interlocked by bending.

FIG. 2 represents, in cross section, a layer composed of interlocked strip 8, with the layer generally constituting inner carcass 1.

Figure 3:
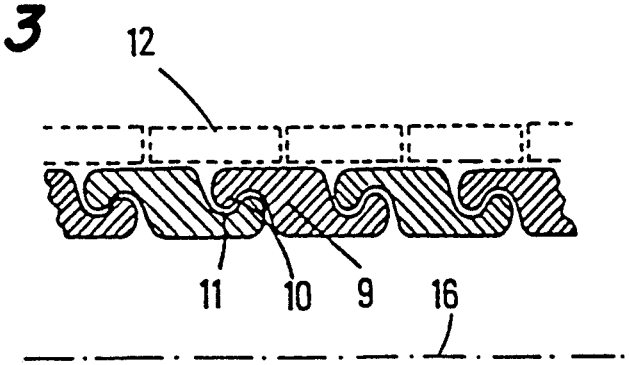
FIGS. 3 and 4 are cross-sectional views of hookable or interlockable profiles which can also be called hooked or interlocked wires.

FIG. 3 represents a zeta-shaped element 9. This profile allows a part 10, such as a lobe or round shape, which cooperates with a hollow 11 in the adjacent turn. Thus, the turns interlock with one another.

The zeta-shaped part is generally used for making the pressure-resistant reinforcement, but may also serve to form the inner carcass 1.

It will not be a departure from the present invention to use profiles other than Z-shaped, particularly, simple profiles such as rectangular or U-shaped cross sections.

FIG. 3 shows in dashed lines a rectangular profile 12 which completes the pressure reinforcement. Thus, in this example, the pressure reinforcement combines a Z-shaped profile with a rectangular cross section, preferably placed outside the Z-shaped profile with respect to the inside of the hose.

Figure 4:
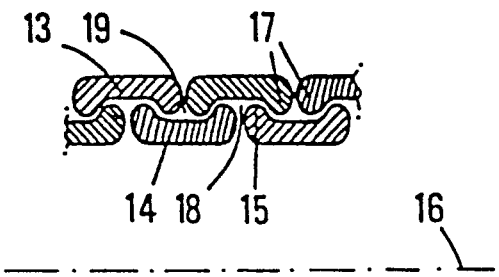

FIG. 4 shows another example of the pressure-resistant reinforcement, this reinforcement being formed from two wires or profiles 13 and 14 having a U-shaped cross section, wound helically.

One of these profiles 14 has the legs 15 of the U facing outward with respect to the axis of hose 16 and the other 13 has the legs 17 of the U facing inward toward the tube axis.

Legs 17 of profile 13 cooperate with hollow 18 of the U of profile 14 and conversely, legs 15 of profile 14 cooperate with hollow 19 of the U of profile 13.

It will not be a departure from the scope of the present invention if certain elements are embedded in a flexible elastomeric resin, particularly if the elements in the tensile-strength reinforcement are embedded in a rubber sheath.

Of the various hose structures to which the present invention may apply, in addition to those given in the examples the following structures should be noted:

a) a hose according to FIG. 1, but without sheath 4, but with a tensile-strength reinforcement 5 and a pressure-strength reinforcement 3 made of aluminum in series 2000, 5000, 6000, or 7000;

b) a hose according to FIG. 1, but without a pressure-strength reinforcement 3 and no sheath 4 and with at least one of the elongated elements remaining in the structure which includes aluminum in series 2000, 5000, 6000, or 7000;

c) a hose according to FIG. 1, but also having the pressure-strength zeta-shaped reinforcing element 3, a wrapped or elongated element with a simply shaped cross section, particularly a rectangular cross section with or without a sheath 4, with at least one of the elongated elements remaining in the structure which includes aluminum in series 2000, 5000, 6000, or 7000;

d) all the examples given in the present application include an inner carcass 1 and a sheath 2, but replace them with a sufficiently flexible sealing tube to allow the final product to be flexible, but with sufficient rigidity not to be crushed when the hose is manufactured.

According to the present invention, when a metal layer is followed by a layer of a different metal, for example, aluminum followed by steel or in certain cases, aluminum of different types, it is preferable to place an insulating sheath between them.

Additionally, one of the components or the elongated elements may be covered by an alloy 21 for protection against oxidation.

Moreover, it will not be a departure from the scope of the present invention to place a sheath or layer 20 of anti-friction material between the various layers of which one of the components according to the invention is composed, particularly in the case of the tensile-strength reinforcement when this is made of steel.

In the present invention, components with aluminum alloys in the series 2000, 5000, 6000, or 7000 may preferably be made essentially of these aluminum alloys.

It is understood that when, in the present invention, the names for aluminum alloys in the 2000, 5000, 6000, or 7000 series are used, the names cover all the alloy grades in each series except for specific cases.

The hose according to the present invention may in particular include composite materials with organic matrices.

In the Examples 2-12 given above, the states mentioned for the various aluminum alloys are preferred states.

The grades and states mentioned in Examples 2 to 6 and 9 to 12 for the elongated elements included in the pressure-strength reinforcement may be used for elongated elements made of aluminum alloy included in the tensile-strength reinforcements.

Moreover, it will not be a departure from the present invention to replace one of the aluminum alloys in the series, grades, and/or states mentioned in the present invention by another equivalent aluminum alloy.

We claim:

1. A reinforced hose including at least one of a pressure-resistance reinforcement, a tensile-strength reinforcement, and an inner carcass, wherein at least one of the pressure-resistance reinforcement, the tensile-strength reinforcement and the inner carcass includes at least one elongated element formed as one of an interlockable profile, an interlockable cable, an interlockable wire, and an interlockable strip, and wherein said at least one elongated element is composed of a 2,000, 5,000, 6,000 or 7,000 series aluminum based alloy, said aluminum alloy having an ultimate tensile strength at least equal to 250 MPa and a yield strength of 0.2% at least equal to 190 MPa, and wherein the aluminum alloy of the 2,000, 6,000 and 7,000 series is cold worked hardened at 3% and at least 20% in the 5,000 series aluminum alloy.

2. A hose according to claim 1, wherein said hose includes the pressure-strength reinforcement and the tensile-strength reinforcement, and wherein said at least one elongated element composed of said aluminum alloy is provided on one of said pressure-strength reinforcement and said tensile-strength reinforcement.

3. A hose according to one of claims 1 or 2, wherein said elongated element has a tensile strength of at least 300 MPa.

4. A hose according to claim 1, wherein said hose includes the inner carcass.

5. A hose according to claim 4, wherein said elongated element is formed as one of the profile and the wire.

6. A hose according to claim 5, wherein said elongated element is formed as a profile having a Z-shaped cross section.

7. A hose according to claim 1, wherein said aluminum alloy is subjected to a dissolution heat treatment.

8. A hose according to claim 7, wherein said at least one elongated element is a work-hardened and tempered element.

9. A hose according to claim 7, wherein said cold work-hardening is in a range of between 3 to 40%, when the aluminum alloy is the 2000, 6000, or 7000 series aluminum alloy.

10. A hose according to claim 7, wherein said cold work-hardening is in a range of between 20 and 90% when the aluminum alloy is in the 5000 series aluminum alloy.

11. A hose according to one of claims 1 or 2, wherein said elongated element is one of a rolled element and a drawn element.

12. A hose according to claim 11, wherein said elongated element is one of partially and totally annealed and hardened-tempered.

13. A hose according to one of claims 1 or 2, wherein said elongated element is covered with an alloy for protection against oxidation.

14. A hose according to claim 13, wherein said elongated element is covered with a thermoplastic film of one of polyethylene, polyamide, PVDF, polypropylene, an elastomer, and a rubber.

15. A hose according to one of claims 1 or 2, wherein said elongated element has a ductility of at least 3%.

16. A hose according to claim 15, wherein, when said aluminum alloy is the 2000 or 7000 series, said elongated element has a ductility of between 6 and 20%.

17. A hose according to claim 15, wherein, when said aluminum alloy alloy is the series 5000 or 6000, said elongated element has a ductility of at least 6%.

18. A hose according to one of claims 1, 2 or 4, wherein said hose includes the carcass, a sheath surrounding said carcass, and one of the tensile-strength reinforcement and the pressure-resistance reinforcement, wherein said carcass comprises one of the interlockable strip and the interlockable wire, and one of said tensile-strength reinforcement and the pressure-resistance reinforcement includes an elongated element formed as one of a profile, a cable, and a wire, and wherein the aluminum alloy of said interlockable strip or said interlockable wire of said carcass is fashioned of the 2000, 5000, 6000, or 7000 series aluminum alloy and wherein the profile, the cable or the wire of said tensile-strength reinforcement or said pressure-resistance reinforcement is fashioned of the 2000, 5000, 6000, or 7000 series aluminum alloy.

19. A hose according to claim 18, wherein the carcass further comprises one of an interlocked steel strip and an interlocked wire.

20. A hose according to claim 18, wherein one of said pressure-resistance reinforcement and said tensile-strength reinforcement includes steel.

21. A hose according to claim 2, wherein said hose includes said tensile-strength reinforcement and said pressure-resistance reinforcement, and wherein said tensile-strength reinforcement essentially consists of a steel and said pressure-resistance reinforcement consists essentially of the aluminum alloy.

22. A hose according to claim 21, further comprising an anti-friction sheath disposed between the pressure-resistance reinforcement and the tensile-strength reinforcement.

23. A hose according to one of claims 21 or 22, wherein the tensile-strength reinforcement includes at least two layers formed as one of wires, a cable, and a profile, and wherein a sheath of anti-friction material is interposed between said at least two layers.

24. A hose according to one of claims 1, 2 or 4, further comprising at least one inner sheath comprising one of a plastic material and an elastic material.

25. A hose according to claim 1, wherein the hose includes the pressure-strength reinforcement, said pressure-strength reinforcement having at least one ply formed from the profile, and wherein said profile has one of a Z-shaped and U-shaped cross section and is made from the 2000, 5000, 6000, or 7000 series aluminum alloy.

26. A hose according to claim 1, wherein the aluminum alloy has one of the following grades: 2014, 2017, 2024, 2117, 2618, 5050, 5052, 5056, 5082, 5086, 5154, 5183, 5754, 6005, 6060, 6061, 6063, 6066, 6070, 6082, 6351, 7001, 7020, 7049, 7050, 7075, 7175, 7178 or 7475.

27. A hose according to one of claims 1 or 26, wherein said aluminum alloy elongated element has a tensile strength of at least 350 MPa.

28. A hose according to claim 1, wherein said aluminum alloy is one of the following grades: 1100, 1180, 3103, 5050, 5052, 5056, 5083, 5456, 6060, 6061, 6082, 6083 or 6106.

29. A hose according to claim 1, wherein the at least one elongated element has a tensile strength of at least equal to 190 MPa.

30. A hose according to claim 9, wherein the cold work-hardening is in a range of between 5 and 25%.

31. A hose according to claim 10, wherein said cold work-hardening is in a range of between 40 and 70%.

32. A hose according to claim 16, wherein the ductility is in a range of between 10 and 20%.

33. A hose according to claim 22, wherein said anti-friction sheath is a sealing sheath of an electrically insulating material.

34. A hose according to claim 24, wherein said plastic material is one of a polyamide and a PVDF.

35. A hose according to claim 24, wherein the elastic material is one of a synthetic rubber and an elastomer.

* * * * *